US012461502B2

(12) United States Patent
Bhattacherjee et al.

(10) Patent No.: US 12,461,502 B2
(45) Date of Patent: Nov. 4, 2025

(54) MEAN TIME BETWEEN FAILURE OF SEMICONDUCTOR- FABRICATION EQUIPMENT USING DATA ANALYTICS WITH NATURAL-LANGUAGE PROCESSING

(71) Applicant: Lavorro, Inc., Palo Alto, CA (US)

(72) Inventors: Arya Priya Bhattacherjee, Livermore, CA (US); David Harrison Webster, Los Altos, CA (US); Scott Michael Braun, San Jose, CA (US)

(73) Assignee: Lavorro, Inc., Palo Alto, CA (US)

( * ) Notice: Subject to any disclaimer, the term of this patent is extended or adjusted under 35 U.S.C. 154(b) by 279 days.

(21) Appl. No.: 17/868,698

(22) Filed: Jul. 19, 2022

(65) Prior Publication Data

US 2023/0024507 A1 Jan. 26, 2023

Related U.S. Application Data

(60) Provisional application No. 63/223,911, filed on Jul. 20, 2021.

(51) Int. Cl.
*G05B 19/18* (2006.01)
*G06F 40/279* (2020.01)
(Continued)

(52) U.S. Cl.
CPC ......... *G05B 19/188* (2013.01); *G06F 40/279* (2020.01); *G06F 40/35* (2020.01);
(Continued)

(58) Field of Classification Search
CPC ........ G05B 19/188; G05B 2219/45031; G05B 2219/32007; G05B 2219/32014;
(Continued)

(56) References Cited

U.S. PATENT DOCUMENTS 11,762,871 B2 * 9/2023 Aalipour Hafshejani ................... G06F 16/3344 704/9
11,935,533 B1 * 3/2024 Wang ................. H04N 21/8586
(Continued)

OTHER PUBLICATIONS

European Patent Office, Extended European Search Report, Apr. 30, 2025, 11 pgs, for EP Application No. 22846536.5.
Jwo, Jung-Sing et al., "Smart technology-driven aspects for human-in-the-loop smart manufacturing", The International Journal Of Advanced Manufacturing Technology, Apr. 2, 2021, pp. 1741-1752, vol. 114, No. 5-6, Springer, London.

*Primary Examiner* — Mohammad Ali
(74) *Attorney, Agent, or Firm* — Dickinson Wright RLLC; Hector A. Agdeppa

(57) ABSTRACT

In one embodiment, a system includes a wafer handling system, processing components, a controller, a virtual assistant, a natural language processing (NLP) engine, and a data-analytics engine. The wafer handling system is configured to hold one or more wafers for processing. The processing components is configured to physically treat the one or more wafers. The controller is configured to operate the processing components. The virtual assistant, in communication with the NLP engine, is configured to receive a user query from a user, understand an intent or context of the user query, and provide a context-specific response to the user query. The data-analytics engine is configured to generate and provide analytical data relating to the user query based on data collected from a plurality of data sources via one or more communication protocols.

20 Claims, 10 Drawing Sheets

(51) Int. Cl.
    *G06F 40/35*          (2020.01)
    *G10L 15/18*          (2013.01)
    *G10L 15/22*          (2006.01)

(52) U.S. Cl.
    CPC .......... *G10L 15/1815* (2013.01); *G10L 15/22* (2013.01); *G05B 2219/45031* (2013.01)

(58) Field of Classification Search
    CPC .......... G05B 2219/35494; G05B 2219/35495; G05B 19/4184; G06F 40/279; G06F 40/35; G06F 40/216; G06F 40/295; G06F 40/30; G10L 15/1815; G10L 15/22
    See application file for complete search history.

(56) References Cited

U.S. PATENT DOCUMENTS

| | | | |
|---|---|---|---|
| 12,020,961 B2 * | 6/2024 | Oberoi | H01L 21/67703 |
| 12,094,448 B2 * | 9/2024 | Santhar | G06F 16/345 |
| 2018/0294174 A1 * | 10/2018 | Fujikata | G05B 19/058 |
| 2019/0325660 A1 * | 10/2019 | Schmirler | G06F 3/011 |
| 2021/0398831 A1 * | 12/2021 | Oberai | H01L 21/67155 |
| 2023/0021529 A1 * | 1/2023 | Bhattacherjee | G06F 40/295 |
| 2023/0024507 A1 * | 1/2023 | Bhattacherjee | G06F 40/216 |

* cited by examiner

MEAN TIME BETWEEN FAILURE OF SEMICONDUCTOR- FABRICATION EQUIPMENT USING DATA ANALYTICS WITH NATURAL-LANGUAGE PROCESSING

PRIORITY

This application claims the benefit under 35 U.S.C. § 119(e) of U.S. Provisional Patent Application No. 63/223,911, filed 20 Jul. 2021, which is incorporated herein by reference.

TECHNICAL FIELD

This disclosure generally relates to the manufacturing of semiconductor devices.

BACKGROUND

Manufacturing of semiconductor devices, such as integrated circuits (ICs), is accomplished with specialized semiconductor-manufacturing equipment referred to as semiconductor-manufacturing tools, semiconductor tools, or tools. The process of manufacturing semiconductor devices involves various steps to physically treat a wafer. For example, material deposition can be accomplished by spin-on deposition, chemical vapor deposition (CVD), or sputter deposition, among other techniques. Tools such as coater-developers and deposition chambers can be used for adding materials to a wafer. Material patterning can be accomplished via photolithography using scanner and stepper tools. Using photolithography, exposure to a pattern of actinic radiation causes a patterned solubility change in a film. Soluble material can then be dissolved and removed. Material etching can be performed using various etching tools. Etching tools can use plasma-based etching, vapor-based etching, or fluid-based etching. Chemical-mechanical polishing tools can mechanically remove materials and planarize a wafer. Furnaces and other heating equipment can be used to anneal, set, or grow materials. Metrology tools are used for measuring accuracy of fabrication at various stages. Probers can test for functionality. Packaging tools can be used to put chips in a form to integrate with an intended device. Other tools include furnaces, CVD chambers, steppers, scanners, physical vapor deposition, atomic layer etcher, and ion implanters, to name a few. There are many tools involved in the process of semiconductor fabrication.

Continuous, accurate, and precise operation of a fleet of semiconductor tools can increase device yield. However, such tools tend to require periodic maintenance as well as unscheduled maintenance due to device failure or materials failure. Indeed, the semiconductor industry often experiences long delays, downtime, and yield loss that cost a significant amount in productivity and depreciation cost of process tools. Process tools experience both periodic maintenance and unscheduled maintenance due to device failure or materials failure. Extending or lengthening mean time between failure (MTBF) of fabrication tools has significant value.

SUMMARY OF PARTICULAR EMBODIMENTS

Particular embodiments provide an architecture for data analytics relating to semiconductor-manufacturing system, equipment, or tools, using natural language processing (NLP), for silicon-fabrication-equipment productivity enhancement and improved MTBF with remote collaboration. In particular embodiments, techniques include use of artificial-intelligence (AI) engines, machine-learning (ML) programs, and language-processing (LP) engines with user-communication devices (such as headsets and wearable visual displays) to provide user assistance and automated optimization worldwide and on individual tools. Particular embodiments provide virtual assistants (e.g., smart bots, conversational bots) that in communication with an NLP engine process human-like natural-language queries from users (e.g., field workers) when there is a need to maintain or repair tools or improve tool usage. For a given user query, the NLP engine can identify an intent of the user in the query, extract one or more entities, identify relationship between these entities, and identify entity attributes. Based on the identified intent, entities, and corresponding entity attributes, a data-analytics engine (or an analytical engine) can perform data analytics and prediction to generate data for the given query. In particular embodiments, the data-analytics engine can collect relevant data from various data sources, group and/or classify the data as needed, and generate various visualizations to help the user with their query. A visualizer can be used to provide an interactive visualization based on the data received from the data-analytics engine. An example visualization, in particular embodiments, can contain comparisons like lot-to-lot wafer results, chamber-to-chamber, tool-to-tool, and slot-to-slot for various chamber attributes like pressure, temperature, gases, etc. In particular embodiments, a virtual assistant (e.g., smart bot), based on the data (e.g., visualizations) obtained through the data-analytics engine and/or visualizer, can return replies back to the user that improve tool performance, usage, or repair.

Advantages of particular embodiments discussed herein include greater semiconductor-manufacturing equipment or tool uptime, lower mean time between failure (MTBF), lower mean time to repair (MTTR), or quicker ramp to yield. Particular embodiments can better predict system or tool creep or better predict process creep. Particular embodiments provide remote tool access as well as remote fab management for process engineers, facilities, maintenance, and field service.

The embodiments disclosed herein are only examples, and the scope of this disclosure is not limited to them. Particular embodiments may include all, some, or none of the components, elements, features, functions, operations, or steps of the embodiments disclosed herein. The subject matter that can be claimed includes not only the particular combinations of features set out in the attached claims, but also includes other combinations of features. Moreover, any of the embodiments or features described or illustrated herein can be claimed in a separate claim or in any combination with any embodiment or feature described or illustrated herein or with any features of the attached claims. Furthermore, although this disclosure describes or illustrates particular embodiments as providing particular advantages, particular embodiments may provide none, some, or all of these advantages.

DESCRIPTION OF EXAMPLE EMBODIMENTS

Particular embodiments provide an architecture for an NLP-driven static and time series data analytics system for productivity enhancement of silicon-fabrication and semiconductor production equipment and improved MTBF with remote collaboration. Particular embodiments include a system and a method of collecting and auto-ingesting multiple forms of data including, for example and without limitation, sensor data, metrology data, and static information (such as, for example, manuals, logs, and training videos) from various processing and metrological equipment involved, organizing and indexing data in an organized database (such as for example, an Extraction Transform Load (ETL)) for real-time and non-real-time use using various AI engines and ML workflow methods to improve processing efficiency, mitigate downtime, improve productivity, and predict future failures.

In particular embodiments, for performing data analytics discussed herein, various types/forms of data can be collected from semiconductor tools, equipment, or system. For instance, the types of data can include sensor data, metrology data, static data, dynamic data, alarm data, time-series data, etc. By way of an example and not limitation, sensor data generated during processing from etch tools can be collected. Such sensor data can be collected over one or more of the following non-limiting example communication interfaces or protocols:

Semiconductor Equipment and Materials International (SEMI) Equipment Communications Standard (SECS)/Generic Equipment Model (GEM);
Equipment Data Acquisition (EDA or Interface-A) Registered Jack 45 (RJ-45);
Network File System (NFS);
Category 6 (CAT-6); or
one or more other suitable communication protocols.

Figure 3:
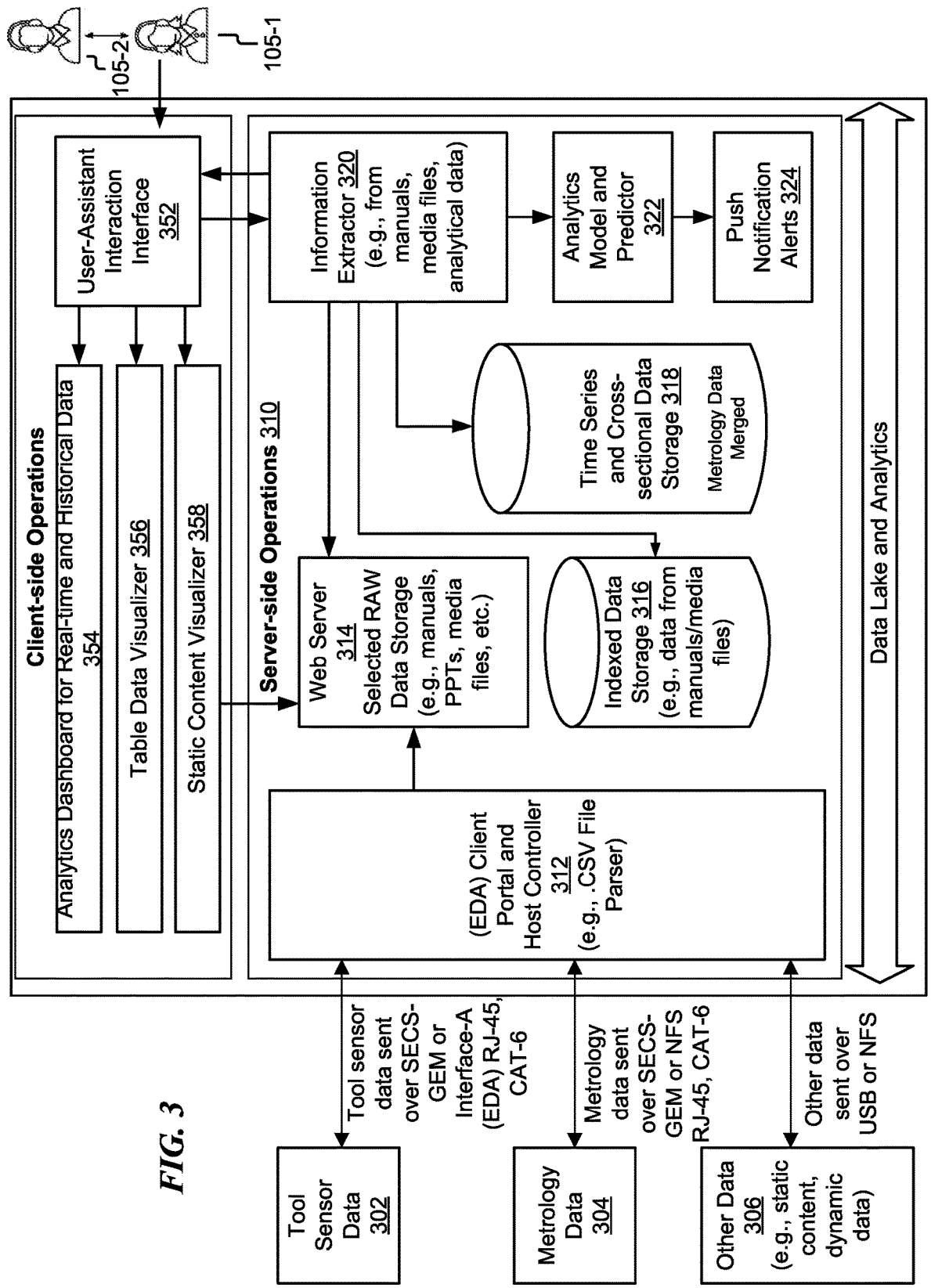
FIG. 3 illustrates example operations and components associated with a data-analytics engine.

In particular embodiments, metrology data can be collected via one or more of SECS-GEM, Network File System (NFS) RJ-45, CAT-6, or one or more other suitable communication protocols through a communication interface established between the described embodiments and the corresponding tools. As one example, and not by way of limitation, sensor and metrology data can be passed to an equipment data acquisition (EDA) client portal and SECS-GEM host controller, such as host controller 312 as shown in FIG. 3, for further processing by a data-analytics engine (e.g., data-analytics engine 170).

In particular embodiments, preprocessing and filtering can be applied on the collected data (e.g., sensor data, metrology data, etc.) to have more useful data that is cleaner (e.g., easier to analyze). Filtered data can then be grouped and/or classified using automated methods, which may be based on or learned from manual input, to form a hierarchical structure before storing into a database, such as database 314, 316, or 318. In particular embodiments, the grouping and classification of the data is performed by the data-analytics engine 170 discussed herein. Stored data as well as grouped/classified data can be used by a virtual assistant (e.g., smart bot) and an NLP engine (e.g., NLP engine 160) to fulfill a user query. For instance, for a given user query, the NLP engine 160 can extract or identify relevant entities, like chamber name, chamber attributes, tool name, time, etc. The NLP engine 160 can also identify a relationship between the identified entities. Based on the identified entities and relationship between these entities, the NLP engine 160 can query the database (e.g., data storage 314, 316, or 318) or the data-analytics engine 170 for required data that a user is looking for, and the data-analytics engine 170 can return with the required data, including different visualizations or dashboards discussed herein, to help the user with the user query.

In particular embodiments, a virtual assistant (also interchangeably herein referred to as a smart bot or an NLP-based bot), an NLP engine (NLP engine 160), and a data-analytics engine (e.g., data-analytics engine 170) works in communication with each other to provide a context-specific response to a user query. The virtual assistant 150 uses or integrates the NLP engine 160 to process human-like natural-language queries from users (e.g., field workers) when there is a need to maintain or repair tools or improve tool usage. For instance, the virtual assistant 150 can receive a user query from a user. The user can be, for example, one of a front-end user, a field service engineer, a technician, a process engineer, or a support user associated with a semiconductor-manufacturing system. The NLP engine 160 can process the received user query to identify an intent of the user in the query, extract one or more entities (e.g., chamber name, chamber attributes, tool name, time, etc.), identify relationship between these entities, and key requirements of the user associated with the user query. After identifying the key requirements, the NLP engine 160 can access corresponding data from the database (e.g., database 314) and format the accessed data before passing it to the data-analytics engine 170.

Based on the identified intent, extracted entities, key requirements, and formatted accessed data from the NLP engine 160, the data-analytics engine 170 can perform data analytics and prediction to generate data for the given query. In particular embodiments, the data-analytics engine 170 can analyze relevant data collected from various data sources (e.g., tool sensor data, metrology data, static information such as operation manuals, logs, and training videos)), group and/or classify the data as needed, and generate various visualizations to help the user with their query. In one embodiment, after obtaining the key requirements from the NLP engine 160, the data-analytics engine 170 analyses and predicts the required information, and responds with the appropriate or corresponding data. In some embodiments, the data-analytics engine 170 performed analysis and prediction in advance of user queries in anticipation of common or expected queries. In some embodiments, a visualizer can be used to provide an interactive visualization based on the data received from the data-analytics engine 170. The visualization, in particular embodiments, can contain comparisons like lot-to-lot wafer results, chamber-to-chamber, tool-to-tool, and slot-to-slot for various chamber attributes like pressure, temperature, gases, etc. In particular embodiments, the virtual assistant 150, based on the data (e.g., visualizations) obtained through the data-analytics engine 170 and/or visualizer, can return replies back to the user that improve tool performance, usage, or repair.

In particular embodiments, the data-analytics engine 170 discussed herein can also provide or generate, via the visualizer, a dashboard that shows real-time visualization of grouped data. The dashboard can contain visualization like the distribution of chamber attributes, various tools, slot IDs, etc. with respect to date and time. Additionally, a user can see a distribution of chamber attributes with respect to chamber names. Dashboards, in particular embodiments, can further contain circular statistical visualization of grouped data distribution, table visualization of chamber-wise data insertion for tools, slots, lots, etc., along with various other graphical visualizations.

Figure 2:
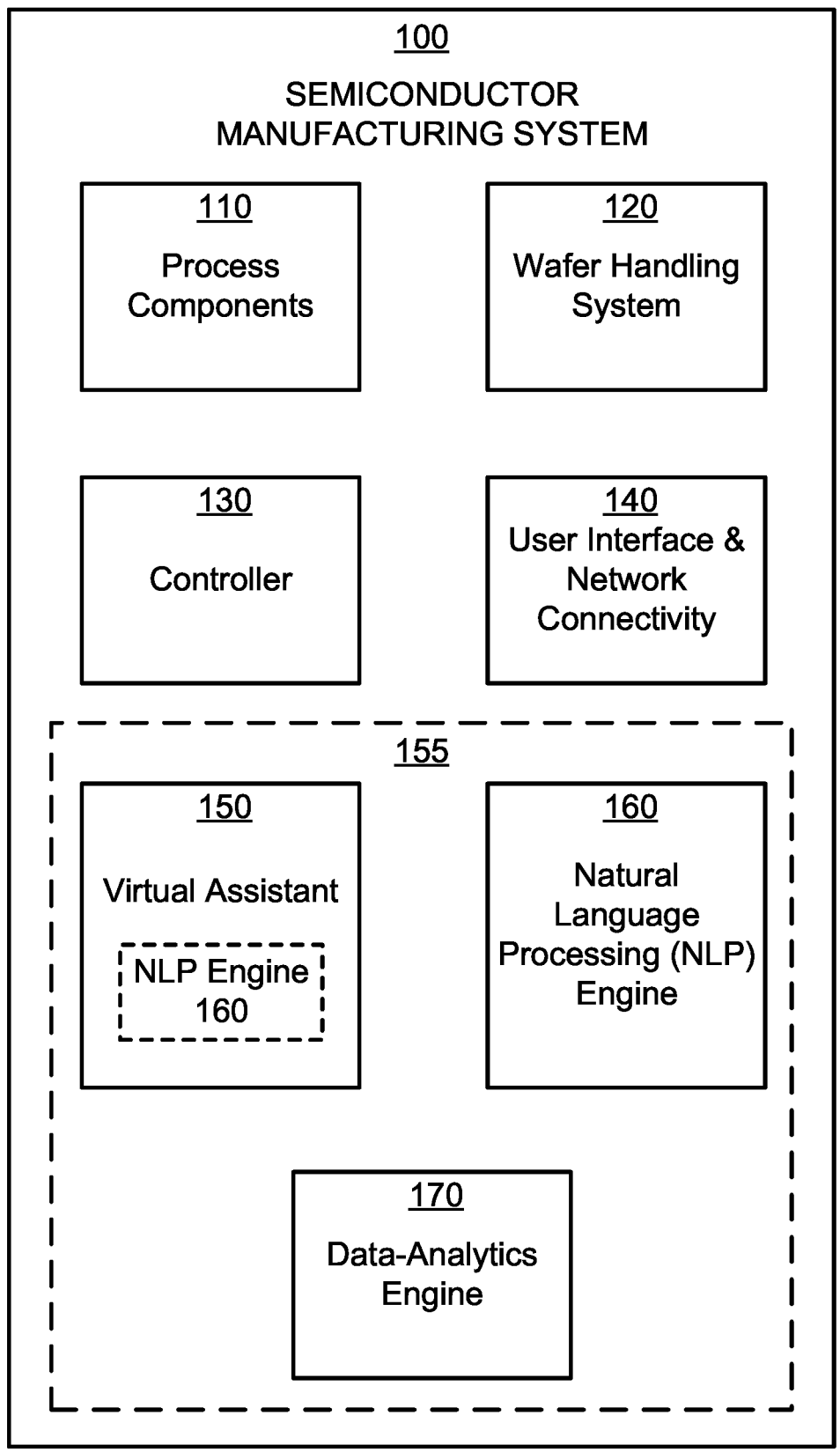
FIG. 2 illustrates an example semiconductor-manufacturing system.

In particular embodiments, a semiconductor-manufacturing system or equipment can include a virtual assistant, an NLP engine, and a data-analytics engine, among other components, as shown for example in FIG. 2. The virtual assistant can be a smart bot, a text bot, a speech bot, a conversational bot, a chat bot, etc. In particular embodiments, the virtual assistant discussed herein is an NLP-based bot. For instance, the virtual assistant uses or integrates an NLP engine for processing enhanced user queries and providing context-specific results. The NLP engine can parse written or spoken user queries, access stored data (e.g., on-tool or network-based), and provide textual responses. An NLP-based bot can be used for various tasks and operations, such as to increase tool uptime. An NLP-based bot includes a virtual assistant or virtual consultant interface that responds to natural language input from a user. NLP-based bots can parse a natural language query and fetch corresponding data or results. NLP-based bots can receive spoken input or keyed-in queries. A speech-to-text engine can assist with converting spoken queries to text. Having an NLP-based bot on a semiconductor-manufacturing system (e.g., semiconductor-manufacturing system 100) enables voice-based trouble shooting, optimization as well as voice control of the tool. Another example embodiment uses an NLP-based bot or smart bot on a semiconductor-manufacturing system to improve one or more tool-driven metrics, such as MTTR and MTBF.

In particular embodiments, local users of fab equipment can use an NLP-based bot or virtual assistant to collaborate with remote-escalations personnel. This can provide more seamless support and secure file sharing with quicker turn-around time, while at the same time being more cost-effective. In particular embodiments, this also includes more seamless customer escalation from a bot (e.g., virtual assistant) to second-line support and third-line support. Reference herein to a bot or smart-bot encompasses a virtual assistant, and vice versa, where appropriate.

In particular embodiments, NLP is a technological process based on deep learning and/or other machine learning techniques that enables computers to acquire meaning from user-text inputs. In doing so, NLP may attempt to understand the intent of the input, rather than just information about the input. There are different ways in which this function can be employed. A particular configuration used can be chosen based on desired usage goals. In the context of bots or virtual assistants, integrating NLP gives a bot more of a human touch or human-like interaction. NLP-powered bots can be configured to assess the intent of input from users and then create responses based on a contextual analysis. In particular embodiments, an NLP-based smart bot can carry information from one conversation to the next and learn as it goes. In particular embodiments, an NLP-based smart bot, when trained on large volumes of domain-based data, can help identify and produce domain-specific insights from queries.

The virtual assistants can be configured to access and operate system components including advance process control (APC) as well as basic process control. In particular embodiments, virtual assistants can be used to identify causes of yield loss as well as improving yield of one or more semiconductor-manufacturing tools. Virtual assistants and their responses can be metric driven. For example, responses can provide input that increases MTBF, increases equipment or tool uptime, reduces MTTR, reduces queue time variance, and can consider entitlement metrics. The virtual assistant is used for contextual searching of the most logical and relevant information that the user is asking for. An artificial intelligence (AI) or machine learning (ML) engine in the virtual assistants can real time learn from user experience. In particular embodiments, a virtual assistant can be trained to provide assistance for trouble shooting or problem solving. For instance, the virtual assistant can ingest various logs and past actions along with logic trees for troubleshooting decision-making to assist a user to access the correct information for the problem solving or lead to remote escalation to a subject matter expert.

In particular embodiments, the virtual assistant is configured to return or respond to inquiries from users, including at-tool users or remote users. The virtual assistant can also execute actions on the tool such as wafer processing or tool maintenance. By way of a non-limiting example, the virtual assistant can be used for fault detection and classification (FDC). For example, a user working on a given process tool encounters a tool failure or fault condition. Instead of relying on operator training or expert technician availability, the user can enter a text query such as to solve a failure condition. The virtual assistant can respond with solutions, additional questions, information, etc., as shown for example in FIG. 1. The solutions and additional help can be in the form of text, audio, video, augmented reality (AR), and automated actions. For example, a given process tool has a failure. By way of text inquiry, a user asks for solutions to address the tool failure. Input can be an error code entered by the user, or the virtual assistant can electronically access error codes and diagnostic data. The virtual assistant can return answers in text, such as steps to take to fix the tool, or display documents and images to assist or explain a particular repair procedure. Alternatively, the virtual assistant can access video showing steps to fix the tool. If, for example, a focus ring is identified as part of a tool failure, the virtual assistant or semiconductor-manufacturing system can return a video showing the best-known way to replace the focus ring. If, instead of tool failure, the issue relates to poor processing, such as non-uniform etching, then an inquiry about how to improve etch uniformity for a given gas, temperature, or film to etch can be entered via the virtual assistant, and then the virtual assistant can return a best-known recipe for a given etch. This best-known recipe can be obtained from data used at any other tool in network or from an extended network, such as from outside a corresponding organization.

Particular embodiments provide a method to create and ingest new "Copy Exact BKM" for virtual-assistant access, including a video archive so that the system learns how to handle the issue (e.g., under bot assistance) for the next use of a particular process or failure response. When a best known method (BKM) for wafer processing or tool repair is identified, this BKM can be stored to be copied exactly at a subsequent execution of the specific wafer processing or same tool failure.

In particular embodiments, users can connect to virtual assistants (e.g., NLP-based bots) using headsets and heads-up displays. In particular embodiments, semiconductor-manufacturing systems have AR user hardware. Both tool use and tool maintenance/repair can be captured and delivered to users via video in AR or virtual-reality (VR) systems. For example, with AR equipment, a user (e.g., a field service engineer) can observe a part of a semiconductor-manufacturing system to repair or service, and information is directly overlaid on that particular semiconductor-manufacturing system. This can reduce training time of tool technicians. Instead of having extensive classes to cover all service procedures, detailed instructions can be delivered to a technician at a tool on demand. Images and video can be overlaid on device parts. Audio instructions can accompany video. The connected virtual assistant can respond to natural language requests such as "How do I access the resist pump on this track tool?" The AR system can guide a user to an access panel, indicate fasteners to remove, display a location of the pump, and instruct on how to repair/replace. Any suitable questions can be answered with tutorials, and any type of image format can be overlaid on tools such as an arrow or a visually highlighted part. This provides an assistant-immersed experience.

An example embodiment includes a head gear system in communication with a virtual assistant on a semiconductor-manufacturing system (e.g., semiconductor-manufacturing system 100). The head gear system includes wearable inputs and outputs to interface with a given tool. Such a head gear system can include a speaker, a microphone, and can also include a visual display. The head gear system can receive natural language input. The headgear system or a processor in communication with a head gear unit can translate spoken language into text to interact with the smart bot on the semiconductor-manufacturing system.

One embodiment includes use of on-tool AI for semiconductor equipment. One or more AI engines can be incorporated in a semiconductor-manufacturing system (e.g., semiconductor-manufacturing system 100). Alternatively, the AI engine can be in a network communication with the semiconductor-manufacturing system. Such an AI engine can assist users (e.g., local users or remote users) with many operations such as to correct failures, optimize operation, and repair failures. The AI engine can access any or all of these models and systems in responding to user queries, commands, and actions. In some embodiments, the AI engine can monitor tool usage, recipe selection, operating parameters, and other actions, and then suggest to user optimized recipes, warn or predict potential failures, recommend repairs to increase uptime, and other actions and suggestions to generally increase uptime and yield. Deep learning via an AI engine or other analysis tools can be used on a semiconductor-manufacturing system to enhance function of onboard operational capabilities of the semiconductor-manufacturing system. Response and actions of the AI engine can be in response to user queries or background monitoring of tool usage. The AI engine can include a web interface configured to compare and contrast data sets from different pieces of semiconductor equipment. The AI engine on a tool can provide a comparison between best known methods and apply deep learning to establish which method, of a set of possible methods, performs better. This comparison can be based on AI analysis.

Particular embodiments can augment systems and methods providing automated assistance on semiconductor equipment via virtual attendants and virtual consultants (bots or software bots), such as those disclosed in U.S. patent application Ser. No. 17/353,362, entitled Automated Assistance in a Semiconductor Manufacturing Environment, which is herein incorporated by reference in its entirety and discloses, among other things, using software bots, AI, ML, and NLP on semiconductor-manufacturing tools. In particular embodiments, techniques include bots, AI engines, ML programs, and language-processing (LP) engines integrated with user-communication devices (such as headsets or wearable visual displays) to provide user assistance and automated optimization worldwide and on individual tools. In particular embodiments, on-tool automated assistants (e.g., smart bots, NLP-based bots, AI engines) can function as a first point of information and resource before escalating to field service engineering.

Figure 1:
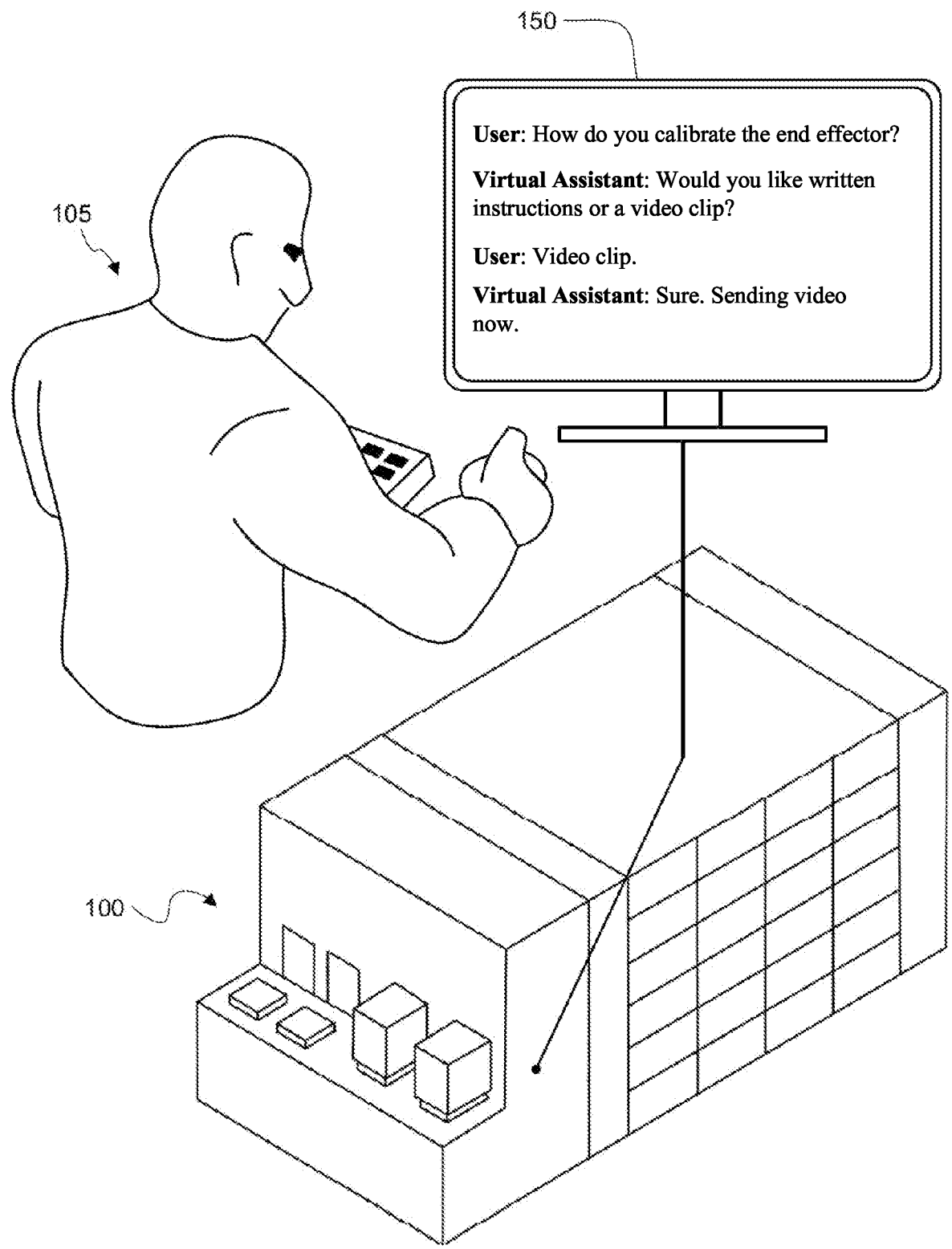
FIG. 1 illustrates an example overview of a semiconductor-manufacturing system providing virtual assistance to a user through a virtual assistant.

FIG. 1 illustrates an example overview of a semiconductor-manufacturing system 100 providing virtual assistance to a user 105 through a virtual assistant 150. The system 100 can be any apparatus configured to process/treat semiconductor wafers or other micro-fabricated substrates. For example, semiconductor-manufacturing system 100 can be a coater-developer, scanner, etcher, furnace, plating tool, metrology tool, etc. User 105 can be any operator such as a process engineer, technician, field service engineer, among others. Semiconductor-manufacturing system 100 includes an on-board virtual consultant, such as the virtual assistant 150. The virtual assistant 150 can be embodied as any of, or any combination of, text chat bot, speech-to-text chat bot, smart bot, or AI engine, with LP or NLP. With such a system, a given user can directly query the virtual assistant 150 to receive answers to any questions such as how to perform a given wafer treatment process, what errors were recorded in a given time frame, how a particular component is repaired or replaced, and so forth.

FIG. 2 illustrates an example semiconductor-manufacturing system 100. Although a particular semiconductor-manufacturing system configuration is described and illustrated, this disclosure contemplates any suitable semiconductor-manufacturing system configuration. In the example of FIG. 2, semiconductor-manufacturing system 100 includes process components 110, a wafer handling system 120, a controller 130, user interface and network connectivity components 140. The semiconductor-manufacturing system 100 further includes one or more software modules. The software modules can include software module directed to control one or more of the hardware components. The software modules can further include one or more software modules provided by a separate entity and directed to improve the usability of the semiconductor manufacturing system 100. As indicated by the box 155, software module of this type can include a virtual assistant 150, an NLP engine 160, and a data-analytics engine 170. In some embodiments, the NLP engine 160 can be included as a separate entity or component in the semiconductor-manufacturing system 100. In other embodiments, the NLP engine 160 can be integrated into or be part of the virtual assistant 150 (e.g., as shown by dotted line or box).

The process components 110 are configured to physically treat one or more surfaces of wafers. The particular process components 110 depend on a type of tool and treatment to be performed. Particular embodiments function on any number or type of process tool. For example, with an etcher tool, process components 110 can include a processing chamber with an opening to receive a wafer. The processing chamber can be adapted for vacuum pressures. A connected vacuum apparatus can create a desired pressure within the chamber. A gas-delivery system can deliver process gas or process gases to the chamber. An energizing mechanism can energize the gas to create plasma. A radio frequency source or other power delivery system can be configured to deliver a bias to the chamber to accelerate ions directionally. Likewise, for a coater-developer tool, such process components 110 can include a chuck to hold a wafer and rotate the wafer, a liquid dispense nozzle positioned to dispense liquid (e.g., a photoresist, developer, or other film-forming or cleaning fluid). As can be appreciated, the coater-developer tool can include any other conventional componentry.

The wafer handling system 120 is configured to hold one or more wafers (substrates) for processing. Wafers can include conventional circular silicon wafers, but also includes other substrates. Other substrates can include flat panels such as for displays and solar panels. The wafer handling system 120 can include, but is not limited to, wafer receiving ports, robotic wafer arms and transport systems, as well as substrate holders including edge holders, susceptors, electrostatic chucks, etc. In some embodiments, the wafer handling system 120 can be as simple as a plate to hold a wafer while processing. The wafer handling system 120 can include handlers and associated robotics to receive wafers from a user or wafer cartridge, transport to processing modules, and return to an input/output port or other module within the tool.

The controller 130 is configured to operate the process components 110. The controller 130 can be positioned on the tool (e.g., semiconductor-manufacturing tool) or can be located remotely connected to the tool. The controller 130 can include all of the tool processor, memory, and associated electronics to control the tool including control of robotics, valves, spin cups, exposure columns, and any other tool component.

The user interface and network connectivity components 140 can include any display screen, physical controls, remote network interfaces, local interfaces, and so forth.

The virtual assistant 150 is configured to understand intent of user queries and return responses based on identified user intent, as well as knowledge of tool usage. The virtual assistant 150 uses an NLP engine 160 or works in communication with the NLP engine 160 for processing enhanced user queries and providing context-specific results. For instance, the virtual assistant 150, using the NLP engine 160, can identify human-like natural language queries from field workers when they need to maintain or repair semiconductor-manufacturing tools or improve tool usage and replies to queries with one or more responses that assist with tool usage and repair. As depicted, the virtual assistant 150 can include or integrate the NLP engine 160 (e.g., as shown by dotted lines). Alternatively, the NLP engine 160 can be installed on or within the semiconductor-manufacturing system 100 as a separate entity. The virtual assistant 150 can be installed on or within the semiconductor-manufacturing system 100 for immediate use without any network connection. In addition or as an alternative, virtual assistant 150 can be installed in an adjacent server or network. Virtual assistant 150 can be installed at a remote location and can connect or otherwise support any number of different tools.

The virtual assistant 150 can have various alternative architectures. For example, the virtual assistant 150 can have a corresponding processor and memory positioned at the tool (e.g., within the tool, mounted on the tool, or otherwise attached to the tool). Alternatively, the bot execution hardware can be located remotely, such as in a server bank adjacent to a tool (or fab), or the bot can be executed while geographically distant (e.g., in a separate country). Configurations can have redundant, multiple or complementary assistants. For example, particular embodiments can include an on-tool assistant as well as a remote assistant with either assistant able to respond to inquiries and execute actions. Alternatively, an on-tool assistant can address one group or type of inquiry (e.g., diagnostic information), while a remote server-based assistant can access deep learning and network data, as well as data from other tools within an integration flow to predict failures and suggest actions for optimization.

The NLP engine 160 is configured to identify intent and entities from a user query (e.g., written or spoken user query), predict an action based on the identified intent and entities, and generate a response based on the user query and predicted action. In particular embodiments, the NLP engine 160, works in communication with the smart bot 150, to receive the user query and generates the response. The NLP engine 160 discussed herein is trained based on a transformer model architecture. Particular embodiments herein include using relatively large volumes of semiconductor data to train the NLP engine 160. The trained NLP engine 160 can be used for various tasks including, for example and without limitation, named entity recognition, text generation, question answering, etc. The transformer model in the NLP engine 160 is an architecture that aims to solve sequence-to-sequence tasks while handling long-range dependencies with relative ease. In contrast to directional models, which read the text input sequentially (left-to-right or right-to-left), in particular embodiments, a transformer encoder reads or analyzes an entire sequence of words at once or together. This method can be considered bidirectional, though it can be more accurate to say that this processing is non-directional. This characteristic helps the NLP engine 160 to learn the context of a word in a user query based on its surroundings (e.g., words, phrases, and information positioned both left and right of the word). The NLP engine 160 is discussed in further detail below in reference to at least FIGS. 3 and 4.

Particular embodiments herein use the virtual assistant 150 configured with the NLP engine 160 to find linguistic expressions in a given text (e.g., user query) that refer to any semiconductor-related entity and to resolve linguistic expressions by replacing pronouns with noun phrases. The NLP engine 160 can substantially understand the meaning of each word based on context both to the right and to the left of the word, which enables the virtual assistant 150 in particular embodiments to learn context. In particular embodiments, techniques include using virtual assistants to extract, process, cleanse, parse, and store semiconductor-related multimedia data (including but not limited to text, images, videos and tables) in a structured format that facilitates gaining insights of data. In particular embodiments, virtual assistants store the parsed information into a search engine that is scalable and resilient and is designed to allow relatively fast, full-text searches.

As an example, particular embodiments use an NLP-based bot or virtual assistant 150 that is trained on large volumes of semiconductor data, identifies best results, and then sorts results based on a score after getting a response from a corresponding search engine. Particular embodiments include using an NLP-based bot 150 that identifies intent and entities from user queries using NLP (e.g., NLP engine 160) and predicts a next action based on a confidence score with respect to intent identified using a dialogue manager. In particular embodiments, a bot controller can, based on a predicted action, perform a requested task and return a response to the user.

The data-analytics engine 170 is configured to analyze data retrieved or extracted from a data storage, re-format or organize the data based on user preferences and requirements, group and/or classify the data as needed, and generate analytical data, including various visualizations and dashboards. The analytical data can help a user (e.g., novice user) with respect to a semiconductor-manufacturing equipment or tool. In particular embodiments, the data-analytics engine 170 can provide, via a visualizer, an interactive visualization, such as comparisons like lot-to-lot wafer results, chamber-to-chamber, tool-to-tool, and slot-to-slot for various chamber attributes like pressure, temperature, gases, etc., as shown for example in FIG. 4. The data-analytics engine 170 can also generate a dashboard, such as dashboard 620 shown in FIG. 6, that shows real-time visualization of grouped data. In particular embodiments, the data-analytics engine 170 works in communication with the NLP engine 160 to generate analytical data and predictions for a user in response to a user query, as discussed elsewhere herein.

FIG. 3 illustrates example operations and components associated with a data-analytics engine 170 discussed herein. In particular, FIG. 3 shows an example overview of use and analytics of data collected from various data sources, in accordance with particular embodiments. Data can be collected from various data sources. Collected data can include, for example and not by way of limitation, (1) sensor data 302 (e.g. pressure sensor, temperature sensor, voltage, state-data such as valve open/closed, runtime instructions such as the tool was told to take a certain action as compared to actual results, etc.) from one or more semiconductor-manufacturing tools (e.g., etch tools), (2) metrology data 304 (e.g., actual images, scanned data from tools such as a SEM/FIB metrology instrument or virtual metrology such as special results as a function of operation (e.g. positional x,y and focus/tilt data captured during wafer processing operations)) associated with the tools, and (3) other data 306. The other data 306 can include, for example, static content (e.g., operation manuals, user manuals, PDFs, PPTs, video, media files, other text files, etc.) associated with the one or more tools, dynamic data of tool data that needs to be metric analyzed over NLP and dashboard, time-series data, alarm data, etc. In particular embodiments, one or more pre-processing and filtering steps can be performed on the collected data, as discussed in further detail below in reference to FIG. 5. In particular embodiments, the tool sensor data 302 can be sent over SECS-GEM or Interface-A RJ-45, and CAT-6 communication interfaces or protocols. As an example, the metrology data 304 can be sent over SECS-GEM or NFS RJ-45, and CAT-6 communication protocols. As an example, the other data 306 (e.g., static data, dynamic data) can be sent over USB or NFS. Based on the collected data, the data-analytics engine 170 can perform server-side operations 310 and client-side operations 350. Each of these operations 310 and 350 is discussed below. Specific examples of communication protocols to send and receive example data are provided without limitation, other suitable communication protocols can be used as needed within a specific fabrication environment.

At the server side 310, an EDA client portal and SECS-GEM host controller 312 of the data-analytics engine 170 collects the data 302, 304, and 306 via suitable communication protocols discussed herein. In particular embodiments, the host controller 312 is configured to collect data from a tool and transmit its analyzed data back to the tool via one or more suitable communication protocols, such as SEMI, SECS-GEM, NFS interfaces, etc. The collected data by the host controller 310 can be stored in different forms, formats, groups, or categories in different databases or data storages. For instance, raw data (i.e., collected data without any processing or filtering) can be stored at a web server 314 in a selected raw data storage. This raw data storage can be used by the virtual assistant 150 (e.g., smart bot) to retrieve any relevant data (e.g., user manuals, operation manuals, PPTs, media files, etc.) associated with a tool that a user is looking for. The data-analytics engine 170 can index the collected data and store indexed data in an indexed data storage 316. The indexed data can be used to quickly look up and retrieve data from the storage 316. The data-analytics engine 170 can further organize the collected data with respect to date and time, and merge different data (e.g., 302, 304, 306) together and store the organized and merged data in a time series and cross-sectional data storage 318.

In particular embodiments, an information extractor 320 can access one or more of these data storages 314, 316, or 318 to extract or retrieve relevant data based on user preferences, requirements, or analytics performed by the analytics model and predictor 322. The information extractor 320 works in communication with a user-bot interface 352 to receive information related to a query from a user 105-1. The information received from the user-bot interaction interface 352 can include, for example and without limitation, user query, identified user intent in the query, extracted entities (e.g., chamber name, chamber attributes, tool name, time, etc.), relationship between entities, entity attributes (e.g., temperature, pressure, gas etc.), user preferences, user requirements for specific data or information, etc. In particular embodiments, this information can be processed by the NLP engine 160 discussed herein. The information extractor 320 can send this information received from the user-bot interaction interface 352 along with extracted data to an analytics model and predictor 322 for further processing.

In particular embodiments, the analytics model and predictor 322 is configured to analyze the extracted data by the information extractor 320, re-format or organize the data based on user preferences and requirements, group and/or classify the data as needed, and generate various visualizations. In some embodiments, the analytics model and predictor 322 is configured to identify a relationship between the user query and the collected data 302, 304, and 306 from the plurality of data sources. Based on the identified relationship, the analytics model and predictor 322 can send instructions to the information extractor 320 to extract data from one or more data storages 314, 316, or 318 accordingly. In some embodiments, the analytics model and predictor 322 works in communication with a visualizer (e.g., visualizer 420) to provide an interactive visualization based on the grouped and/or classified data. The visualization, in particular embodiments, can contain comparisons like lot-to-lot wafer results, chamber-to-chamber, tool-to-tool, and slot-to-slot for various chamber attributes like pressure, temperature, gases, etc., as shown for example in FIG. 4. In some embodiments, the analytics model and predictor 322 can also generate a dashboard (e.g., dashboard 620) that shows real-time visualization of grouped data. The dashboard can contain visualization like the distribution of chamber attributes, various tools, slot IDs, etc. with respect to date and time. Additionally, a user can see a distribution of chamber attributes with respect to chamber names. Dashboards, in particular embodiments, can further contain circular statistical visualization of grouped data distribution, table visualization of chamber-wise data insertion for tools, slots, lots, etc., along with various other graphical visualizations. In particular embodiments, the analytics model and predictor 322 works in communication with the information extractor 320 to provide one or more visualizations (e.g., tool-to-tool comparison, chamber-to-chamber comparison, tool data plot, data distribution based on chambers, comparison of chamber attributes based on different chambers, etc.) and/or dashboards (e.g., dashboard 620) via the user-bot interaction interface 352. In some embodiments, the analytics model and predictor 322 can send out push notification alerts 324 to one or more devices (e.g., user devices associated with users 105-1 and 105-2, semiconductor-manufacturing system 100, etc.) based on its analysis and predictions.

At the client side 350, the user-assistant interaction interface 352 interfaces with a user 105-1 through a virtual assistant or bot, such as virtual assistant 150. For instance, the virtual assistant 150 receives a query (e.g., natural language query) from the user 105-1. The user 105-1 can be a local user. For instance, through a user device (e.g., AR headset), the local user 105-1 can communicate with the virtual assistant 150 such as by natural language text or speech. The virtual assistant 150 works in communication with the NLP engine 160 to process the natural language query, as discussed elsewhere herein. The virtual assistant 150 can return answers via audio, text, video, or other media. The virtual assistant 150 can be on-tool or network located and can access data storages 314, 316, and 318 to retrieve stored and real-time data. A remote user 105-2 can be in communication with both the virtual assistant 150 and the local user 105-1. With a VR headset, the remote user 105-2 can view video and audio from the local user 105-1, send instructions to the local user 105-1. Both users can be collaborative, or expert and novice. For example, the expert user 105-2 can be remotely located and assist the local user 105-1 located at a location that can be in a different country or area.

Based on the user query and associated information (e.g., identified user intent in the query, extracted entities, relationship between entities, entity attributes, user preferences, user requirements for specific data or information) processed by the NLP engine 160, the user-bot interaction interface 352 can communicate with the information extractor 320 or the analytics model and predictor 322 to obtain analytical data, including one or more visualizations or dashboards, to display to the user 105-1. As an example, the user-bot interaction interface 352 can present an analytics dashboard 354 (e.g., dashboard 620) that shows real-time visualization of grouped data and historical data. The dashboard 354 can contain visualization like the distribution of chamber attributes, various tools, slot IDs, etc. with respect to date and time. As another example, the user-bot interaction interface 352 can present a table visualization of chamber-wise data insertion for tools, slots, lots, etc. through a table data visualizer 356. Yet as another example, the user-bot interaction interface 352 can present a static content visualization through a static content visualizer 358.

Figure 4:
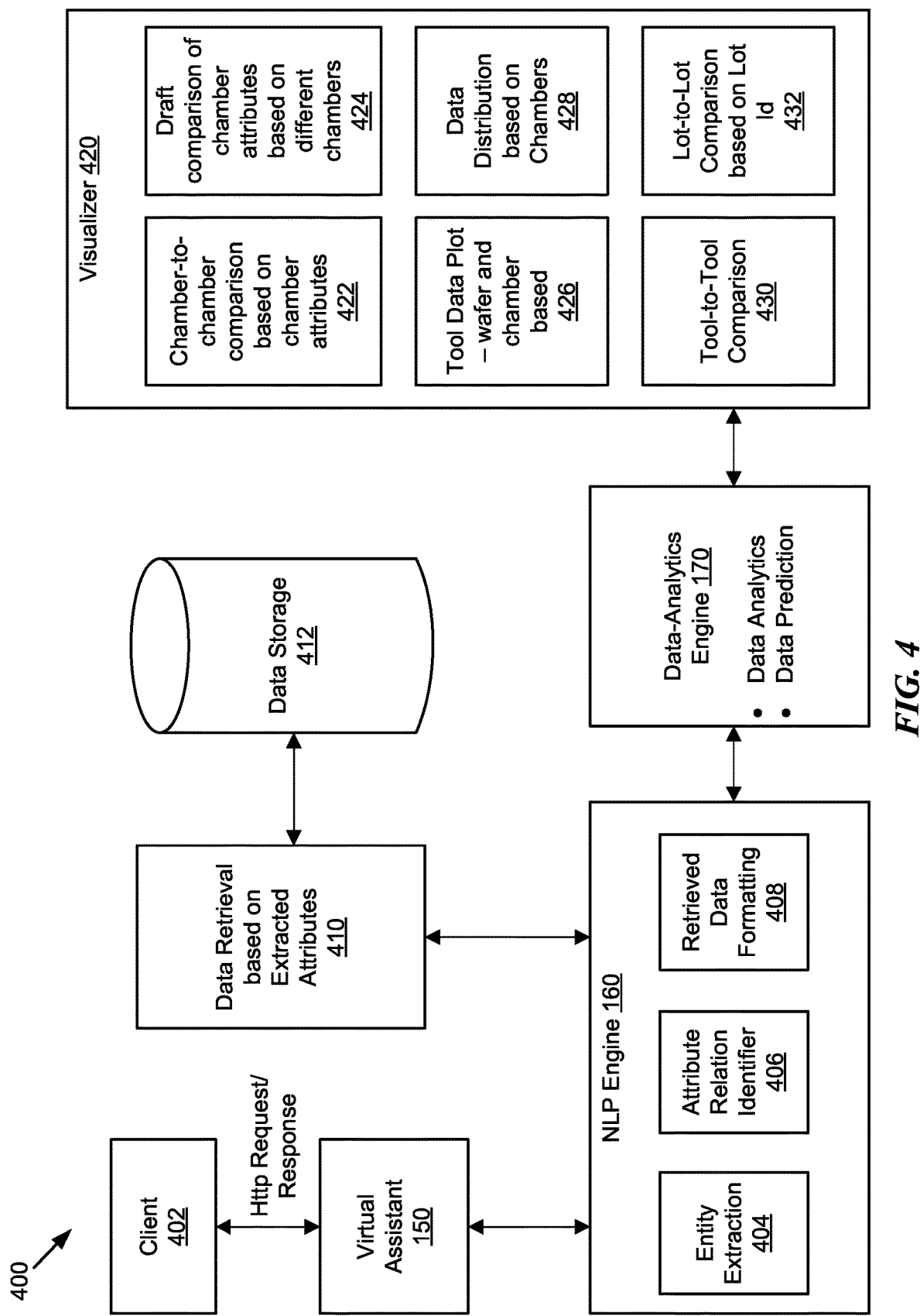
FIG. 4 illustrates an example interaction between a user, a virtual assistant, a natural language processing (NLP) engine, and a data-analytics engine.

FIG. 4 illustrates an example interaction 400 between a user 402, a virtual assistant 150, an NLP engine 160, and a data-analytics engine 170. In particular, FIG. 4 shows an example query flow for time series or analytical data and visualization. The query flow begins with receiving a query from a client 402. Here the client 402 can be a local user 105-1 or a remote user 105-2 as discussed above in reference to FIG. 3. The client 402 provides a user query in the form of a HTTP request. The virtual assistant 150 is provided to help the client 402 with the user query. The virtual assistant 150 receives the query from the client 402 and passes to the NLP engine 160, which identifies the requirement of the client (i.e., end user) and entities involved in the query. Specifically, the NLP engine 160 performs entity extraction 404 to extract one or more entities (e.g., chamber name, chamber attributes, tool name, time, etc.). The NLP engine 160 can further, using an attribute relation identifier 406, identify a relationship between these entities and entity attributes (e.g., temperature, pressure, gas etc.). Based on the extracted entities and attributes, the NLP engine 160 performs data retrieval 410 to retrieve relevant data or information (e.g., user manuals, operation manuals, PPTs, media files, etc. associated with a tool) from a data storage 412. Here, the data storage 412 can be one of the raw data storage 314, the indexed data storage 316, the time series and cross-sectional data storage 318, or any other type of data storage. In particular embodiments, the data storage 412 is the time series and cross-section data storage 318. The NLP engine 160, after getting relevant information from the database 412, passes this information to the data-analytics engine 170 for data analytics and prediction. In particular embodiments, the data-analytics engine 170 analyzes the retrieved data from the data storage 412, re-format or organize the data based on user preferences and requirements, group and/or classify the data as needed, and generate analytical data (e.g., visualizations, dashboards, etc.). In some embodiments, the data-analytics engine 170 works in communication with a visualizer 420 to provide an interactive visualization to the client 402 based on the grouped and/or classified data. The visualization, in particular embodiments, can contain various comparisons, such as for example chamber-to-chamber comparison 422 based on chamber attributes, draft comparison of chamber attributes 424 based on different chambers, tool data plot 426, which can be wafer and chamber based, data distribution 428 based on chambers, tool-to-tool comparison 430, and lot-to-lot comparison 432 based on lot id. The visualization can be sent back to the client 402 as part of a HTTP response, where a user (e.g., user 105-1 or 105-2) can then see the visualization/dashboard as requested.

Figure 5:
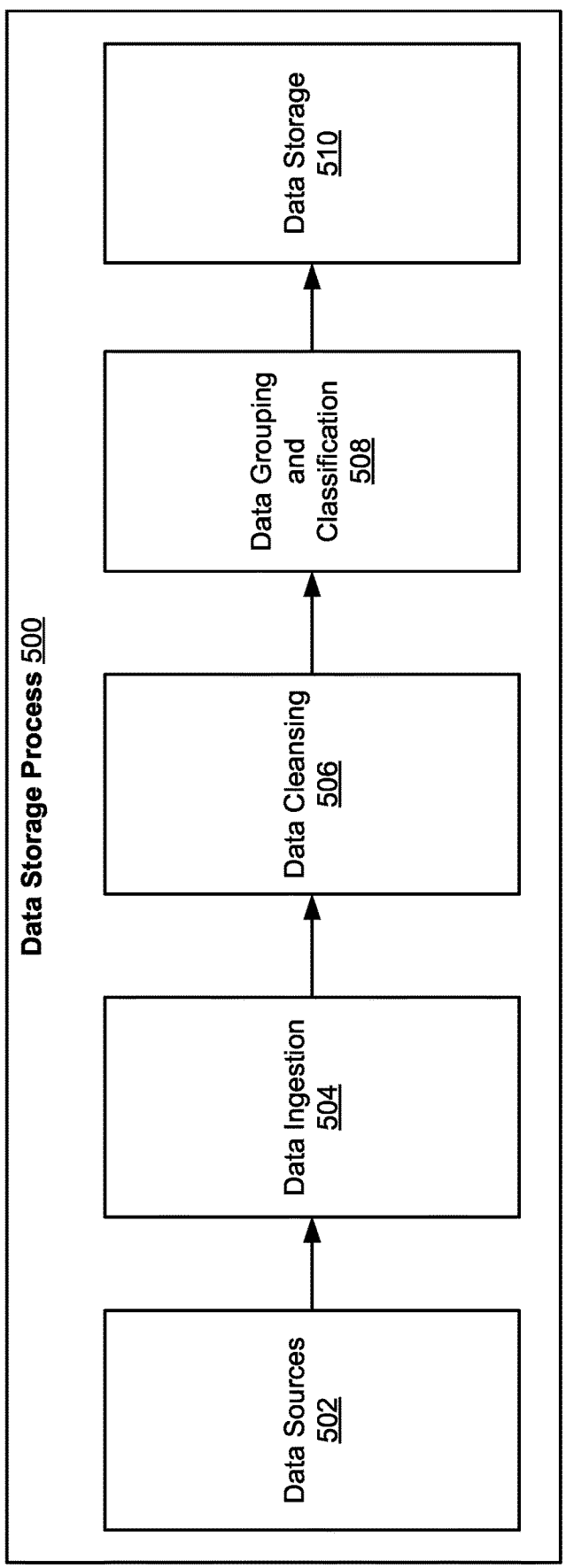
FIG. 5 illustrates an example data storage process.

FIG. 5 illustrates an example data storage process 500. In the example of FIG. 5, one example flow for storing data is illustrated. There can be multiple data sources 502 from which data can be ingested or collected. For instance, the data sources 502 can be static data sources, dynamic data sources, diagnostic data sources, etc. In particular embodiments, the data from these data sources 502 can include, for example and not by way of limitation, (1) sensor data from one or more semiconductor-manufacturing tools (e.g., etch tools), (2) metrology data associated with the tools, (3) static content (e.g., operation manuals, user manuals, PDFs, PPTs, video, media files, other text files, etc.) associated with the one or more tools, (4) dynamic data of tool data that needs to be metric analyzed over NLP and dashboard, (5) time series data, (6) alarm data, etc.

At data ingestion step 504, the data from these data sources 502 can be collected over suitable communication protocols or interfaces. As an example, tool sensor data can be collected over SECS-GEM or Interface-A RJ-45, and CAT-6 communication interfaces. As another example, metrology data can be collected over SECS-GEM or NFS RJ-45, and CAT-6 interfaces. As yet another example, static content can be collected over USB or NFS. At data cleansing step 506, the collected or ingested data can be cleaned, pre-processed, and/or filtered. In particular embodiments, the data cleaning 506 includes preprocessing and filtering the collected data (e.g., sensor data, metrology data, etc.) to have cleaner (e.g., easier to analyze) and more useful data. The cleaned, pre-processed, and/or filtered data then moves into a data grouping and classification step 508. Examples of data grouping can include statistical and machine learning techniques surrounding automated correlation, principal component analysis, anomaly detection and forecast/prediction of future behavior, etc. The data grouping can be done automatically based on a few features or manually for some cases. In some embodiments, the data grouping and classification 508 step is performed by the data-analytics engine 170 discussed herein. The grouped and/or classified data is then stored in a data storage 510. The data storage 510 can be, for example, one of the raw data storage 314, the indexed data storage 316, the time series and cross-sectional data storage 318, or any other type of data storage.

Figure 6:
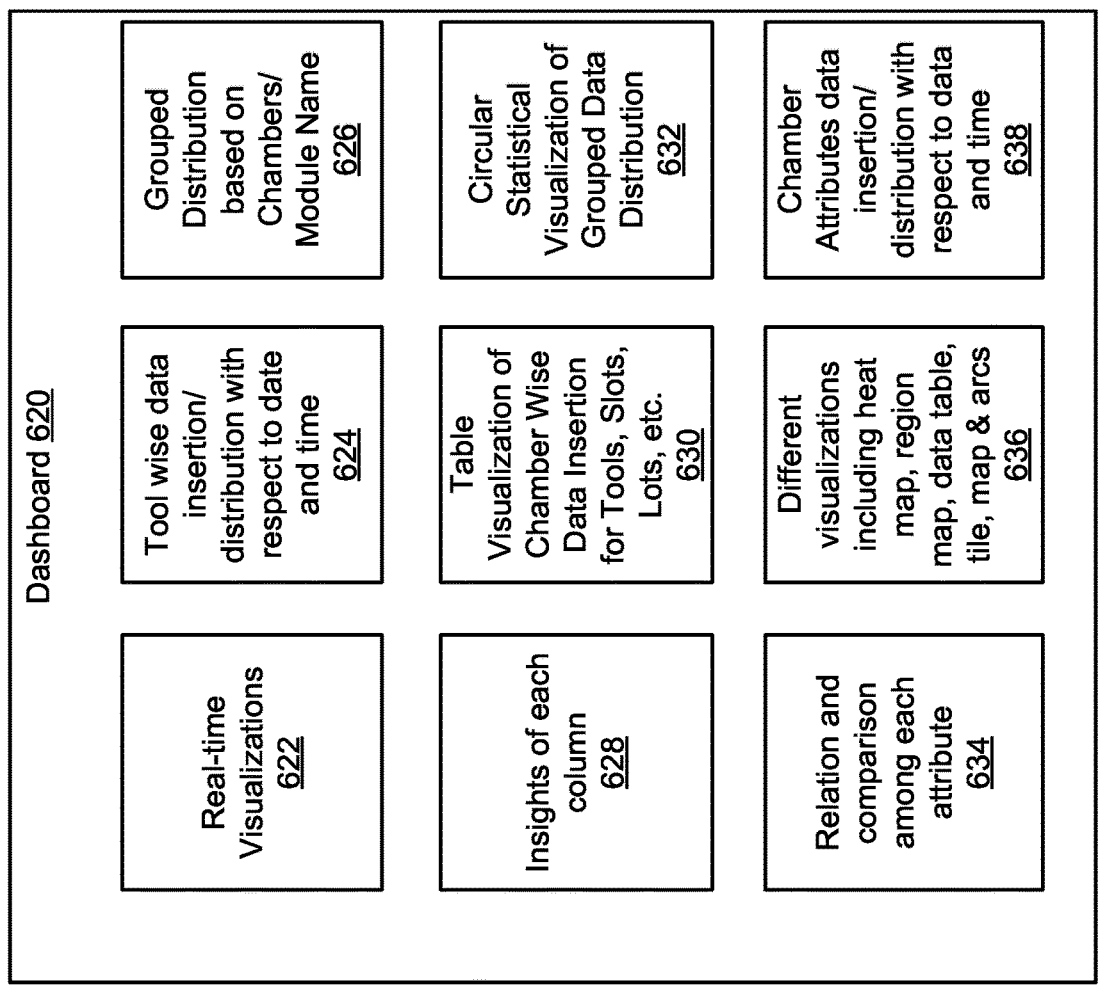
FIG. 6 illustrates an example dashboard of grouped data.
Figure 6:
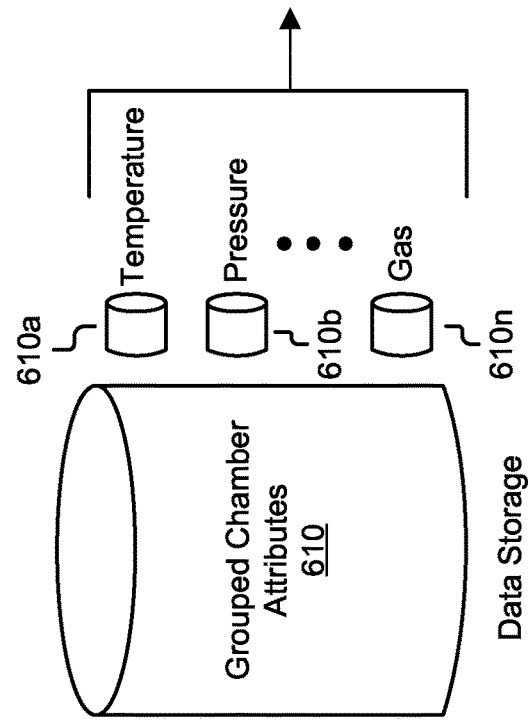

FIG. 6 illustrates an example dashboard 620 of grouped data. In some embodiments, the data-analytics engine 170, based on the entities and entity attributes received from the NLP engine 160, can create the grouped data and store the grouped data in a data storage. The grouped data can include grouped chamber attributes 610, including, for example, temperature 610a, pressure 610b, gas 610n, etc. The data-analytics engine 170 can generate the dashboard 620 based on these grouped chamber attributes 610. The dashboard 620 shows a real-time visualization of the grouped data. The dashboard 620 also contains visualizations like the distribution of chamber attributes, various tools, slot IDs, etc. with respect to date and time. Along with these visualizations, a user can see a distribution of chamber attributes corresponding to chamber names. The dashboard 620 further contains circular statistical visualization of grouped data distribution, table visualization of chamber wise data insertion for tools, slots, lots, and so forth, along with various other graphical visualizations.

As illustrated, an example dashboard 620, generated based on data analytics performed by the data-analytics engine 170, can include one or more of real-time visualizations 622, tool wise data insertion or distribution 624 with respect to date and time, grouped data distribution 626 based on chambers or module name, insights 628 of each column (e.g., standard deviation, percentile, average, max, min, etc.), table visualization 630 of chamber wise data insertion for tools, slots, lots, etc., circular statistical visualization 632 of grouped data distribution (e.g., temperature for PM1/PM2), relation and comparison 634 among each attribute, different visualizations 636 including heat map, region map, data table, tile map, arcs, etc., and chamber attributes data insertion or distribution 638 with respect to date and time (e.g., Gas-01 for PM1 on DD/MM/YY, Gas-01 from PM2)

Figure 7:
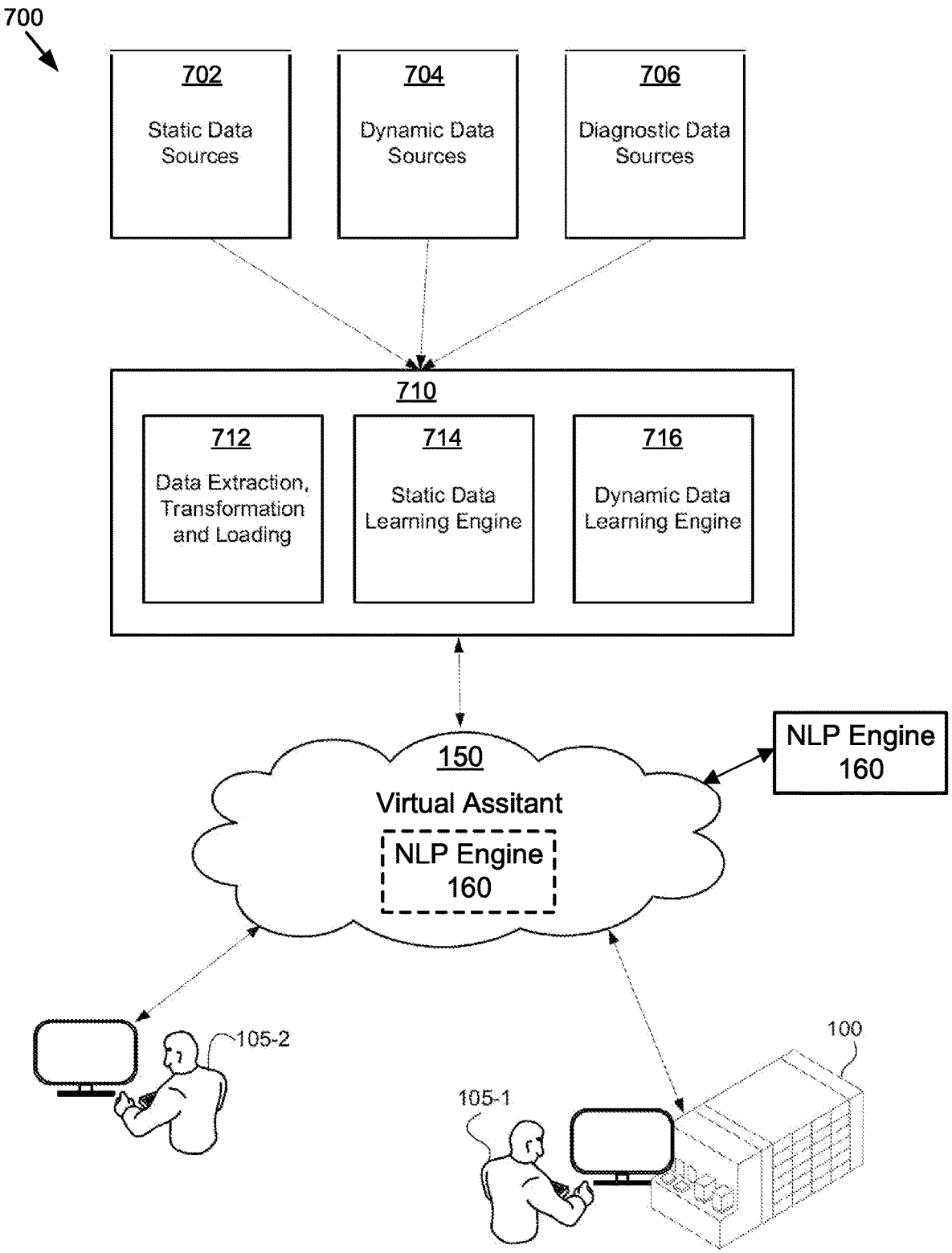
FIG. 7 illustrates an example architecture for data ingestion, retrieval, and deep learning.

FIG. 7 illustrates an example architecture 700 for data ingestion, retrieval, and deep learning. Data sources 702, 704, and 706 can be accessed to extract data (e.g., from user manuals, PDFs files, PPT files, or other text-data files, along with the metadata of media files). This data can be formatted or raw. Data processor 710 can include a data extraction, transformation, and loading (ETL) module 712, a static data learning engine 714 for learning from static data, a dynamic data learning engine 716 for learning from dynamic data, as well as any other data learning and formatting engines such as NLP engines. In some embodiments, the data processor 710 can be the data-analytics engine 170 or a separate content search engine. Processed data can be made available to or pushed to a virtual assistant 150 and/or the NLP engine 160. The virtual assistant 150 and/or the NLP engine 160 can use the processed data to fulfill a user query. The virtual assistant 150 can include the NLP engine 160 or the NLP engine 160 can be a separate entity, as discussed elsewhere herein. Virtual assistant 150 can be located on a given network or located within a semiconductor-manufacturing system 100. Local user 105-1 can directly access, for example, the virtual assistant 150 at the semiconductor-manufacturing system 100. Remote user 105-2 can also access semiconductor-manufacturing system 100 via a network connection.

Figure 8:
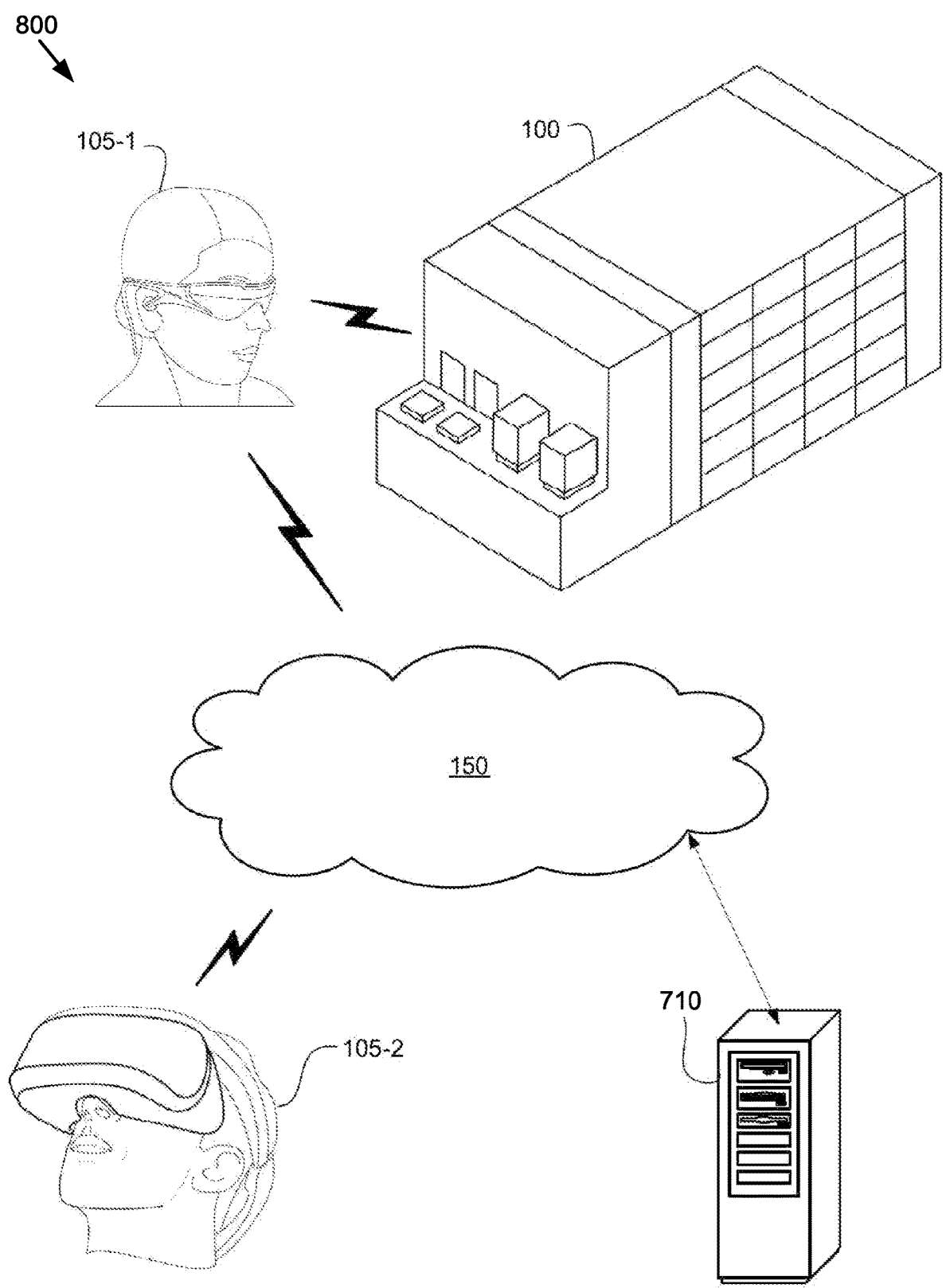
FIG. 8 illustrates an example environment associated with a semiconductor-manufacturing system.

FIG. 8 illustrates an example environment 800 associated with a semiconductor-manufacturing system 100. In the example environment 800, a local user 105-1 can physically access the semiconductor-manufacturing system 100. This can be accomplished via any user input. In this example, the local user 105-1 is equipped with an AR headset. This can include visual overlay of parts and components when viewing the tool or control panel. Through the AR headset, the local user 105-1 can communicate with a virtual assistant 150 such as by natural language speech. The virtual assistant 150 can return answers via audio, text, video, or other media. The virtual assistant 150 can be on-tool or network located and can access data processor 710 (e.g., data-analytics engine 170) to retrieve stored and real-time data. A remote user 105-2 can be in communication with both the virtual assistant 150 and the local user 105-1. With a VR headset, the remote user 105-2 can view video and audio from the local user 105-1, send instructions to the local user 105-1. Both users can be collaborative, or expert and novice. For example, the expert user can be remotely located and assist the local user located at a location that can be in a different country or area. Alternatively, the local user can be an expert on training various remote users on tool operation and maintenance. Although a particular interaction between users and a particular virtual assistant is described and illustrated, this disclosure contemplates any suitable interaction between a user and any suitable virtual assistant. Also, this disclosure contemplates any suitable number of users and any suitable number of virtual assistant configurations to provide automated assistance for semiconductor manufacturing systems. In particular embodiments, assistance can be provided without training or travel.

Figure 9:
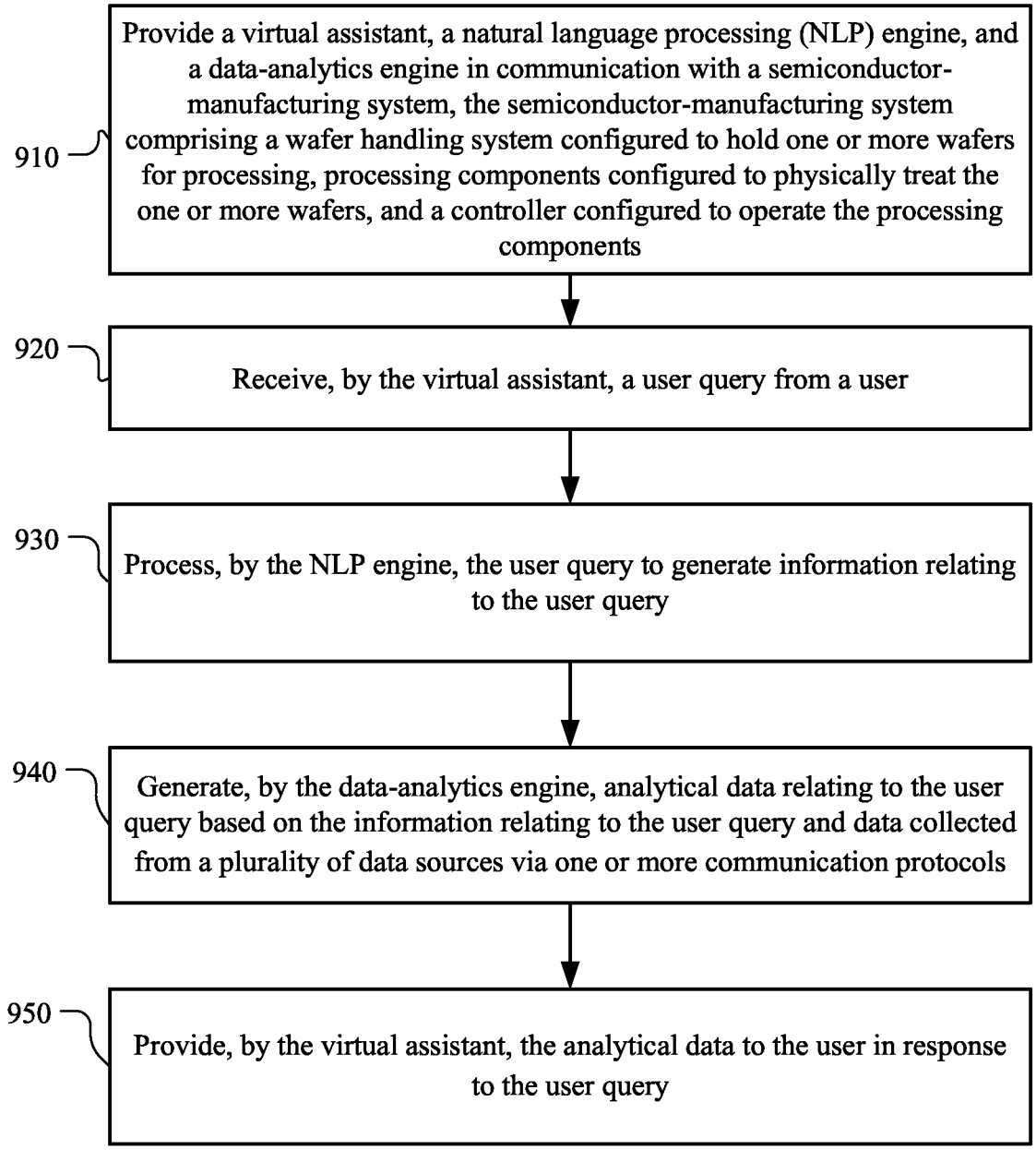
FIG. 9 illustrates an example method for generating and providing analytical data, in accordance with particular embodiments.

FIG. 9 illustrates an example method 900 for generating and providing analytical data, in accordance with particular embodiments. The method 900 can begin at step 910, where a computing system (e.g., computing system 1000) can provide a virtual assistant (e.g., virtual assistant 150), an NLP engine (e.g., NLP engine 160), and a data-analytics engine (e.g., data-analytics engine 170) in communication with a semiconductor-manufacturing system (e.g., semiconductor-manufacturing system 100). As shown and discussed in reference to FIG. 2, the semiconductor-manufacturing system can include a wafer handling system (e.g., wafer-handling system 120), one or more processing components (e.g., process components 110), and a controller (e.g., controller 130). The wafer handling system is configured to hold one or more wafers for processing. The processing components are configured to physically treat the one or more wafers. The controller is configured to operate the processing components. At step 920, the computing system can receive, by the virtual assistant, a user query from a user. The user query can relate to repair, maintenance, or usage of one or more semiconductor-manufacturing tools and the virtual assistant is configured to assist the user with respect to the one or more semiconductor-manufacturing tools. The user can be one of a field service engineer, a technician, or a process engineer associated with the semiconductor-manufacturing system.

At step 930, the computing system can process, using an NLP engine (e.g., NLP engine 160), the user query to generate information relating to the user query. The information can include, for example and without limitation, intent of the user in the user query, user preferences and requirements, one or more entities extracted from the user query, entity attributes, etc. At step 940, the computing system can generate, by a data-analytics engine (e.g., data-analytics engine 170), analytical data relating to the user query based on the information relating to the user query generated by the NLP engine, and data collected from a plurality of data sources via one or more communication protocols or interfaces. Collected data can include, for example, data 302, 304, and 306 discussed herein. The one or more communication protocols can include, for example, SECS-GEM or Interface-A RJ-45, NFS, CAT-6 communication interfaces, etc. At step 950, the computing system can provide, by the virtual assistant, the analytical data to the user in response to the user query.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for generating and providing analytical data, including the particular steps of the method of FIG. 9, this disclosure contemplates any suitable method for generating and providing analytical data, including any suitable steps, which may include a subset of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
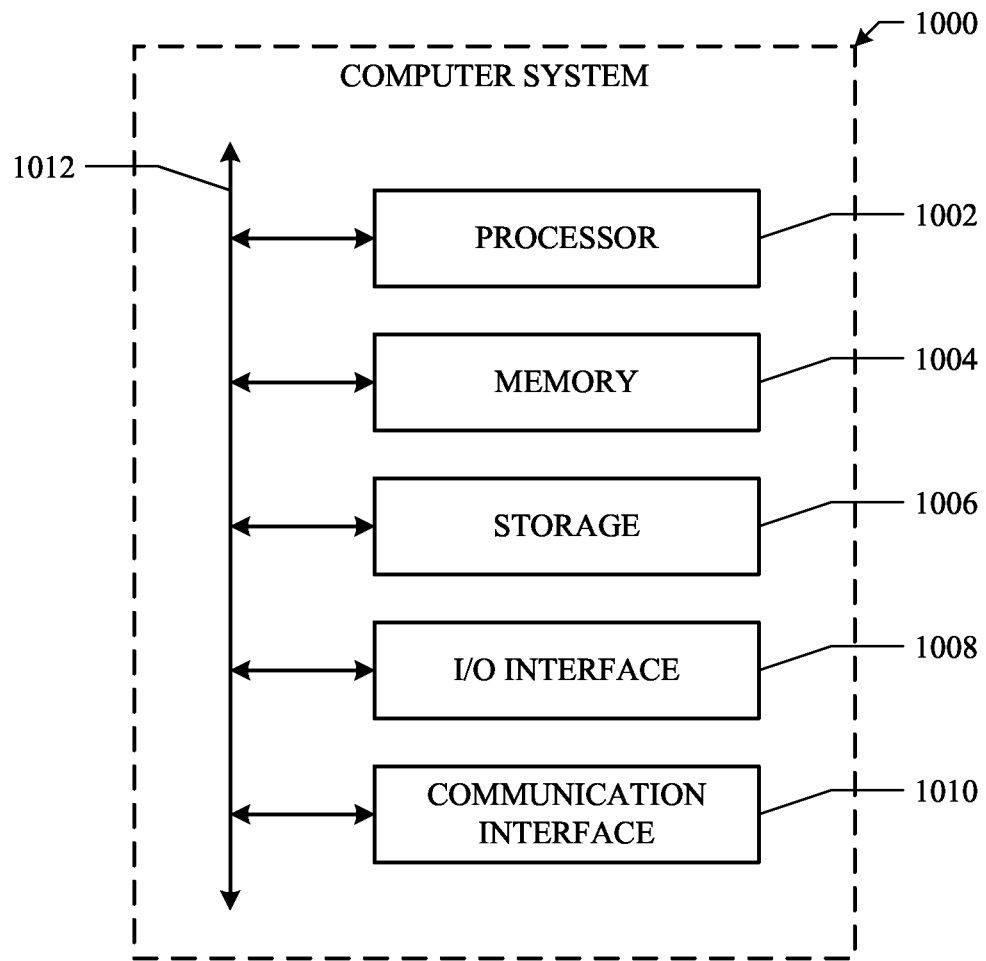
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an AR/VR device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FIF1 network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, the embodiments disclosed herein are only examples, and the scope of this disclosure is not limited to them. Particular embodiments may include all, some, or none of the components, elements, features, functions, operations, or steps of the embodiments disclosed herein. Furthermore, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

The subject matter that can be claimed includes not only the particular combinations of features set out in the attached claims, but also includes other combinations of features. Moreover, any of the embodiments or features described or illustrated herein can be claimed in a separate claim or in any combination with any embodiment or feature described or illustrated herein or with any features of the attached claims. Furthermore, although this disclosure describes or illustrates particular embodiments as providing particular advantages, particular embodiments may provide none, some, or all of these advantages.

Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim or in any combination with any embodiment or feature described or depicted herein or with any of the features of the attached claims.

Reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A system comprising:
   a wafer handling system configured to hold one or more wafers for processing;
   wafer processing components configured to physically treat the one or more wafers;
   a controller in communication with the wafer processing components and configured to operate the wafer processing components;
   a virtual assistant, in communication with a natural language processing (NLP) engine and with the wafer processing components, configured to;
      receive, from a user, a user query related to at least one wafer processing component of the wafer processing components, and
      understand an intent or context of the user query by extracting, from the user query, entities corresponding to the at least one wafer processing component and identifying a relationship between the extracted entities; and
   a data-analytics engine configured to:
      obtain data relating to the intent or context of the user query based by predicting relevant data from data collected from the wafer processing components via one or more communication protocols based on the extracted entities and the identified relationship, and
      generate analytic data by analyzing the obtained data and provide the analytic data to the virtual assistant,
   wherein the virtual assistant is further configured to: identify a cause of yield loss in the wafer processing components based on the analytic data and provide a context-specific response to the user query that comprises information for operating one or more of the wafer processing components to increase yield.

2. The system of claim 1, wherein the data-analytics engine comprises:
   a host controller configured to collect the data from the wafer processing components via the one or more communication protocols, wherein the host controller is further configured to store collected data in one or more data storages;
   an analytics model and predictor configured to re-format and organize the collected data based on user preferences or requirements, group and classify the collected data, and generate the analytical data based on the grouped or classified data;
   an information extractor to extract data from the one or more data storages; and
   a user-bot interaction interface to provide extracted data and the analytical data to the user in response to the user query.

3. The system of claim 2, wherein:
   the analytics model and predictor is further configured to identify a relationship between the user query and the collected data from the wafer processing components; and
   the information extractor is further configured to use the identified relationship to extract the data from the one or more data storages.

4. The system of claim 2, wherein the context-specific response comprises one or more of the extracted data or the analytical data.

5. The system of claim 1, wherein the NLP engine is configured to:
identify the intent of the user in the user query;
extract one or more entities from the user query;
identify a relationship between extracted entities;
identity attributes of the one or more entities; and
identify user preferences or requirements for specific information.

6. The system of claim 5, wherein the data-analytics engine generates the analytical data based on the identified user intent, extracted entities, entity attributes, and identified user preferences or requirements for the specific information.

7. The system of claim 1, wherein the collected data from the wafer processing components comprises one or more of:
sensor data from one or more semiconductor-manufacturing tools;
metrology data associated with the one or more semiconductor-manufacturing tools;
static content associated with the one or more semiconductor-manufacturing tools;
dynamic data of tool data that needs to be metric analyzed;
time-series data; or
alarm data.

8. The system of claim 1, wherein the one or more communication protocols comprises one or more of:
semiconductor equipment communications standard (SECS) and generic equipment model (GEM) (SECS-GEM);
equipment data acquisition (EDA or Interface-A) registered jack 45 (RJ-45);
Network File System (NFS) RJ-45; or
Category 6 (CAT-6).

9. The system of claim 2, wherein the one or more data storages comprises one or more of:
a time series and cross-sectional data storage;
an indexed data storage; or
a selected raw data storage.

10. The system of claim 1, wherein the analytical data comprises one or more visualizations relating to one or more semiconductor-manufacturing tools.

11. The system of claim 10, further comprising:
a visualizer to generate or provide the one or more visualizations based on the analytical data.

12. The system of claim 10, wherein the one or more visualizations comprise comparisons between two or more semiconductor-manufacturing tools.

13. The system of claim 1, wherein the analytical data comprises a dashboard that shows real-time visualization and historical-data analytics for one or more semiconductor-manufacturing tools.

14. The system of claim 1, wherein the user query relates to repair, maintenance, or usage of one or more semiconductor-manufacturing tools.

15. The system of claim 1, wherein the virtual assistant is one of a conversational bot, a text chat bot, a speech-to-text chat bot, a smart bot, or a virtual consultant.

16. The system of claim 1, wherein the virtual assistant is a NLP-based bot.

17. The system of claim 1, wherein the user is one of a field service engineer, a technician, or a process engineer associated with a semiconductor-manufacturing system.

18. The system of claim 1, wherein the data-analytics engine is further configured to group collected data in a hierarchical structure.

19. The system of claim 1, wherein collected data is cleansed, filtered, or pre-processed prior to generating the analytical data.

20. A method comprising:
providing a virtual assistant, a natural language processing (NLP) engine, and a data-analytics engine in communication with a semiconductor-manufacturing system, the semiconductor-manufacturing system comprising a wafer handling system configured to hold one or more wafers for processing, wafer processing components configured to physically treat the one or more wafers, and a controller configured to operate the processing components;
receiving, by the virtual assistant from a user, a user query related to at least one wafer processing component of the wafer processing components;
processing, by the NLP engine, the user query to understand an intent or context relating to the user query by extracting entities corresponding to the at least one wafer processing component and identifying a relationship between the extracted entities;
obtaining, by the data-analytics engine, data relating to the intent or context of the user query by predicting relevant data from data collected from the wafer processing components via one or more communication protocols based on the extracted entities and the identified relationship;
generating, by the data-analytics engine, analytical data by analyzing the obtained data; and
providing, by the virtual assistant, the analytical data to the user in response to the user query,
wherein the virtual assistant is further configured to: identify a cause of yield loss in the wafer processing components based on the analytic data and provide a context-specific response to the user query that comprises information for operating one or more of the wafer processing components to increase yield.

* * * * *